United States Patent [19]
Less

[11] 3,949,492
[45] Apr. 13, 1976

[54] WRITING GUIDE

[76] Inventor: Albert J. Less, 3615 W. 90th Place, Westminster, Colo. 80030

[22] Filed: Apr. 18, 1975

[21] Appl. No.: 569,362

[52] U.S. Cl. .................................... 35/38; 40/353
[51] Int. Cl.² .................................... G09B 21/00
[58] Field of Search ......... 35/38, 35 B; 40/341, 352, 40/353, 356; 197/181.1

[56] References Cited
UNITED STATES PATENTS

| | | | |
|---|---|---|---|
| 121,026 | 11/1871 | Briesen | 35/38 X |
| 358,814 | 3/1887 | Merril | 40/353 X |
| 1,340,529 | 5/1920 | Davison | 35/38 |
| 1,372,360 | 3/1921 | McNeill | 35/38 |
| 1,908,874 | 5/1933 | Van Alstine | 40/353 |
| 2,819,541 | 1/1958 | Brown | 35/38 |
| 3,255,538 | 6/1966 | Gooch | 35/35 B |
| 3,386,191 | 6/1968 | Michel | 35/38 |
| 3,524,268 | 8/1970 | Venturi | 35/35 B |
| 3,713,230 | 1/1973 | Essmann | 35/38 |

*Primary Examiner*—Wm. H. Grieb
*Attorney, Agent, or Firm*—Roylance, Abrams, Berdo & Kaul

[57] ABSTRACT

A writing guide having a paper support surface, a paper retaining clip, a stiff writing guide strip with an elongated slot and a mechanism for stepwise moving the strip from the top to the bottom of the paper. The mechanism includes a square stop bar with sets of spaced stops protruding from each face thereof. The strip carries an abutment finger. The stop bar is mounted for unidirectional rotation about an axis parallel to the direction of motion of the strip so that a set of stops lies in the path of travel of the finger. A knob at one end of the bar is manually rotated, removing one set of stops from the path of travel and moving the next set into the path, the stop sets being longitudinally offset so that the finger can move longitudinally from one stop to the next. A spring continually urges the strip and finger toward the bottom of the page. A guide supports the strip and maintains it in proper position relative to the stop bar and the support surface. The entire mechanism is rotatable about the stop bar axis to facilitate paper replacement. The support surface is one face of a paper storage box having an interior paper retaining spring. A detent spring forces the stop bar into increments of 90° rotation. An adjustable stop device can be provided in the strip slot to match the edges of pieces of paper having different widths. An improved clip for retaining paper has turned-down end corners.

18 Claims, 12 Drawing Figures

WRITING GUIDE

This invention relates to a writing guide and, more specifically, to an apparatus for providing a guide for a writing implement and means for stepwise moving the guide, line by line, down a sheet of paper.

The basic problem treated by this invention is the obvious one of the difficulty faced by a blind person attempting to write in a conventional visible script on a sheet of paper or the like without having the lines of written script overlap or slant in a manner which renders the script difficult to read by one having sight. In this context, the term "blind" is used in its broadest sense to mean a person having temporarily or permanently defective sight, the person's sight being sufficiently defective so that he has difficulty seeing when he has written. It is, of course, not necessarily limited to one having absolutely no visual capability at all.

Many devices have been developed by workers in the field over a span of many years in an effort to develop an apparatus which can be used by a blind person, without assistance, in a fashion which prevents, to the extent possible, malfunction. It will be recognized that such a device must be simple and easy to use and must leave no doubt, without visual inspection, of its proper operation. Clearly, if malfunctions occur, the blind person is frequently unable to check the operation of the device or correct the malfunction.

Examples of devices which have been previously developed are found in U.S. Pat. Nos. 121,026, Briesen; 1,340,529, Davison; 1,372,360, McNeill; 2,819,541, Brown; and 3,386,191, Michel. Each of these patents, while probably operative, presents one or more disadvantages such as requiring extensive manipulation by the user, or not providing a sufficiently positive movement of the writing guide to allow the user to be sure that it has moved to the proper position and that his next line to be written will not overlie a previously written line. Also, some of these devices are sufficiently cumbersome and complex as to be overly expensive to produce and as to be cumbersome to transport and use.

Accordingly, it is an object of the present invention to provide a writing guide having a movable guide member which is positively transferred from one line to the next in incremental, stepwise fashion by simple manipulation of a single control knob, making it particularly easy for use by a blind person.

A further object is to provide a writing guide in which the stepwise motion of a guide member is positive and firmly located and in which the positioning is unambiguous.

A further object is to produce a writing guide apparatus which is relatively simple and inexpensive to produce and which is nevertheless reliable.

Yet another object is to provide a writing guide apparatus in which components are relatively easily replaceable so that line spacing and width can be selected in accordance with the individual requirements of the user.

Briefly described, the present invention contemplates a writing guide having means for defining a writing support surface having top, bottom and side edges, means for retaining material such as paper to be written on on the surface, an elongated writing guide strip having a slot to define a zone within which a writing implement can be used, means for supporting the writing guide strip adjacent to the surface with the slot extending across the paper and for moving the writing guide strip parallel to itself in predetermined increments from a location near the top edge toward a location near the bottom edge, this means comprising spring means for continuously urging the writing guide strip toward the bottom edge, a plurality of stops, abutment means carried by and movable with the strip for contacting the stops, and manually rotatable means for successively moving the stops into the path of travel of the abutment means as a rotatable means is rotated, each stop moved into the path of travel for contact with the abutment means being longitudinally spaced from the preceding stop by a distance equal to the desired space between writing lines on the paper. The stop apparatus can include a stop bar having a plurality of sets of radially protruding stop members, means for mounting the stop bar for rotation about an axis parallel with one of the side edges, each of the sets of stop members on the bar including a plurality of stop members arranged in a spaced linear array along a line parallel with the axis, each of the sets of stop members being angularly separated from each adjacent set thereof by a predetermined angle with all of those angles being equal and the total of the angles being 360°, each of the stop members being longitudinally offset from the closest stop members in adjacent sets by a distance defining an increment of said strip. A means for manually rotating the stop bar through the predetermined angle is then provided to permit the abutment means to lose contact with one stop member and move into contact with the next longitudinally offset stop member in the next adjacent set in response to the urging of the spring means.

In order that the manner in which the foregoing and other objects are attained in accordance with the invention can be understood in detail, particularly advantageous embodiments thereof will be described with reference to the accompanying drawings, which form a part of this specification, and wherein.

Figures 1, 2:
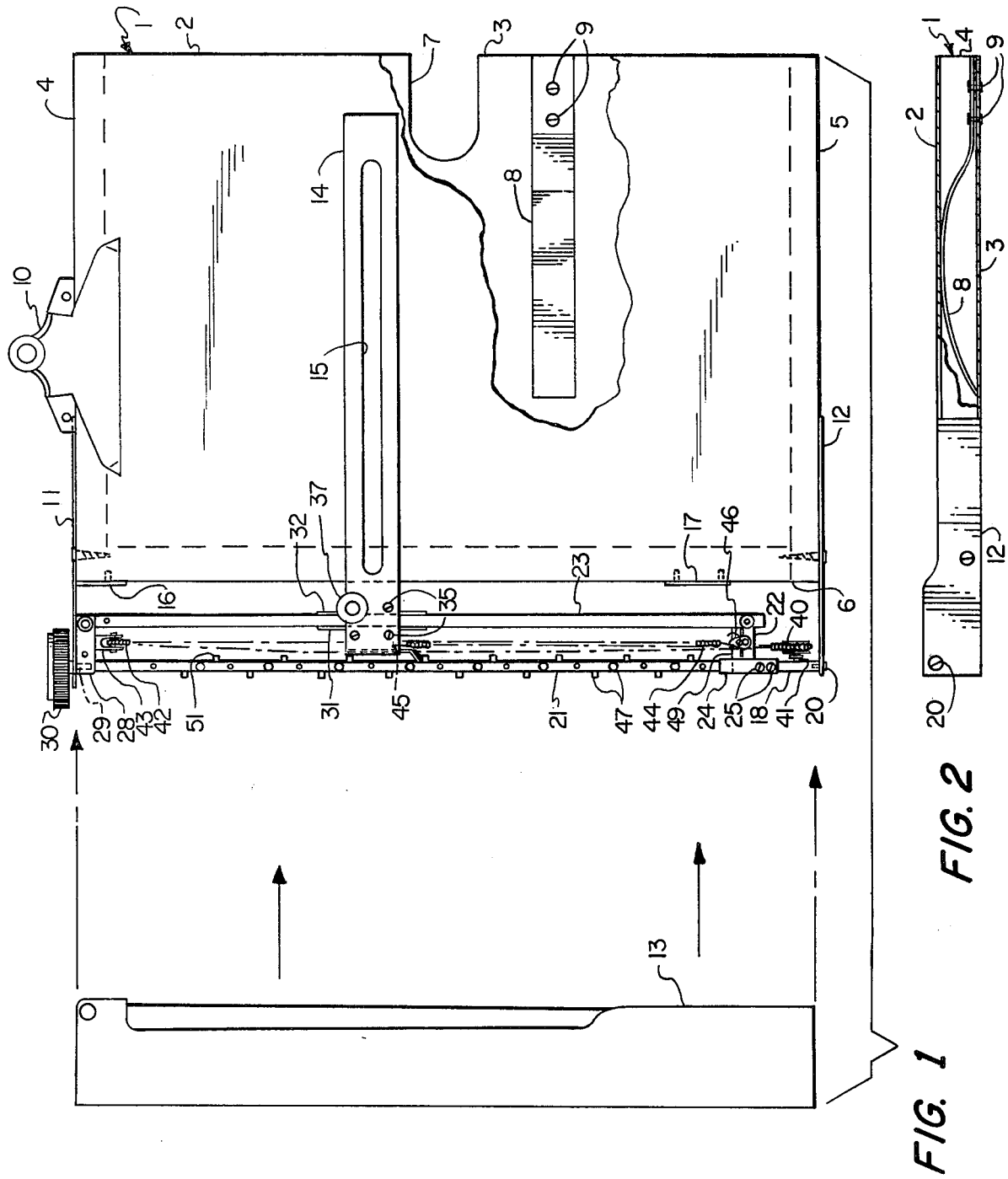
FIG. 1 is a plan view, partly cut away and partly exploded, of an apparatus according to the invention.
FIG. 2 is an end elevation, partly cut away, of the apparatus of FIG. 1.
Figure 3:
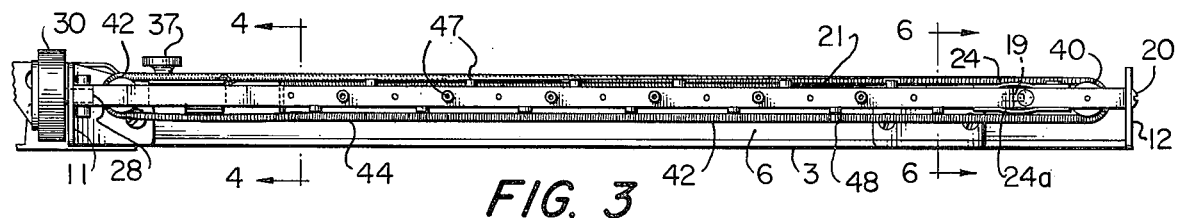
FIG. 3 is a side elevation, with the cover removed, of the apparatus of FIGS. 1 and 2.

Referring now to the figures in detail, and referring first to FIGS. 1-3, it will be seen that FIG. 1 includes a housing indicated generally at 1 having a top surface 2 which constitutes a writing support surface, a back surface 3 and top and bottom end walls 4 and 5. A side wall 6 completes this basic housing which defines an interior cavity having an open side along one edge of the writing support surface into which paper can be inserted for convenient storage. The back surface 3 is provided with a slot 7 into which the user's finger can be inserted to extract a single sheet of paper. A lear spring 8 is attached to back surface 3 and curves toward the back of the writing support surface to prevent paper from sliding out of the open side if the container is tipped. Spring 8 is firmly attached to the surface 3 by conventional fastener means such as screws or rivets 9.

A paper retaining spring clip 10 is attached to upper end wall 4 in a manner to retain the paper against surface 2 so that it can be written upon. An upper end bracket 11 and a lower end bracket 12 are attached to end walls 4 and 5 and protrude beyond the left hand edge of surface 2 to support the indexing apparatus to be hereinafter described. A generally U-shaped cover 13 of sheet metal or plastic is provided to cover the mechanism. This cover is shown in exploded position in FIG. 1 and is omitted from the other figures for clarity, the primary function of the cover being to protect the user's hands from the spring-loaded mechanism and, secondarily, to enhance the appearance of the apparatus.

An elongated writing guide strip 14 normally, in use, lies across and adjacent to surface 2 and the paper retained thereon, the paper lying between the strip and the support surface. Guide strip 14 is provided with an elongated slot 15 which defines a zone within which a writing implement such as a pen or a pencil can be moved to write upon the paper. As will be seen, this guide strip is easily replaceable and a strip having a slot of desired width can be chosen to the writer's preference.

Paper marginal alignment guides 16 and 17 are attached, as by screws to side wall 6. Guides 16 and 17 can be flat, relatively rigid metal plates which protrude upwardly above surface 2 to provide lateral stops for the side edge of the sheet of paper so that the user can positively feel that the paper is in its proper location.

End brackets 11 and 12 provide the means for supporting the mechanism which constitutes the means for supporting the writing guide strip adjacent to the surface and for moving the writing guide strip parallel to itself in line-by-line increments from the top to the bottom edge of the paper.

A short mounting shaft 18 extends from the inner surface of bracket 12 toward bracket 11, the distal end of shaft 18 having a pivot pin 19 secured in the end thereof and protruding from the end thereof toward bracket 11. A second pivot pin 20 extends through an opening in bracket 12 and into the end of the short mounting shaft. Pivot pin 20 can constitute a threaded fastener such as a conventional machine screw which extends into a threaded opening in shaft 18, threads in the shaft being undersized to provide persistance to threading of screw 20. Alternatively, screw 20 can be a shoulder screw, the opening in bracket 12 being large enough to accommodate the shoulder so that bracket 12 is slightly clamped between the screw head and the end of shaft 18, thereby allowing the mounting shaft to be rotated about its central axis with respect to the bracket. A stop bar 21 is disposed in coaxial relationship with shaft 18, bar 21 having an opening in the end thereof to receive the protruding portion of pivot pin 19, thereby permitting relative rotation between bar 21 and shaft 18. A first spacer member 22 extends perpendicular to bar 21 and is fixedly attached thereto. The other end of spacer member 22 is fixedly attached to a guide bar 23 which extends parallel to bar 21. Bars 21 and 23, as well as mounting shaft 18, are conveniently formed from stock material having a square cross-section, although, as will be indicated hereinafter, other cross-sectional shapes can be employed. A detent device comprising two flat leaf springs 24 and 24a is attached to the upper and lower surfaces, respectively, of shaft 18 such as by screws 25, the free end of springs 24 and 24a extending beyond the end of shaft 18 and overlapping the end of shaft 21. As will be recognized, these springs tend to maintain the outwardly facing surface of bar 21 in alignment with the similar surface of shaft 18.

The other end of guide bar 23 is connected to a relatively short second spacer member 28 which is disposed close to and parallel with the inwardly facing surface of bracket 11. The other end of stop bar 21 abuts the inwardly facing surface of spacer 28. An axle 29 extends into the end of bar 21 and passes through aligned openings in bracket 11 and spacer 28 so that the axle is rotatable relative to the bracket and spacer 28. Thus, bar 21 is also rotatable relative to both the bracket and the spacer. A knob 30 is fixedly attached to the end of the axle which protrudes beyond the outer surface of bracket 11, this knob constituting the means for manually rotating the stop bar.

Guide strip 14 is mounted in slidable relationship on bar 23 by a structure which can be most clearly seen by referring to FIGS. 1, 4, 5 and 12. This structure includes guide walls 31 and 32 which are side portions of a U-shaped guide member 38 most clearly shown in FIG. 12. Walls 31 and 32 are adjacent to the side surfaces of bar 23. Four sleeves 33 are fixedly attached to guide 38 and extend between the under surface of strip 14 and an abutment member support bracket 34 which has an L-shaped portion and a laterally extending portion 39, the upper surface of bracket 34 being in contact with the bottom surface of guide 38. Sleeves 33 receive machine screws 35 which pass through the strip and the sleeves and are threaded into bracket 34. The upwardly extending L-shaped portion of bracket 34 supports an abutment member 36 which extends from bracket 34 toward the bottom end of the mechanism. The distal end of member 36 is curved to present a concave face to stop bar 21 so that as the stop bar is rotated the corner thereof deflects abutment member 36 a minimum amount, permitting one outer edge thereof to remain in position to contact stop 51 until the bar has been rotated through almost the complete 90° rotation and to permit the other edge thereof to remain in position to engage the next stop 54 being rotated into position. A knob 37 forms or is attached to the head of one of screws 35 to provide means for manually returning the guide strip to its position nearest clip 10.

Figure 4:
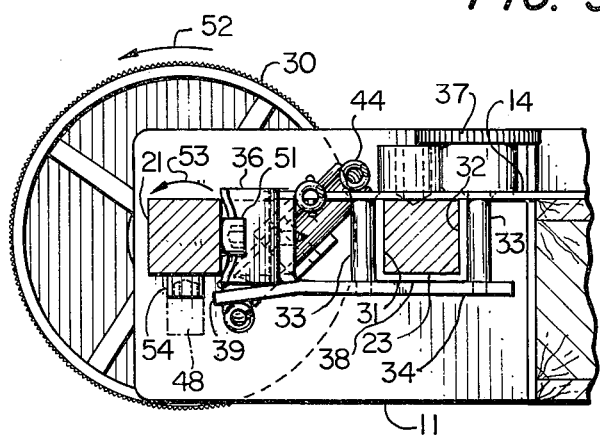
FIGS. 4 and 5 are partial sections along line 4—4 of FIG. 3 showing the apparatus in two positions of use.
Figure 7:
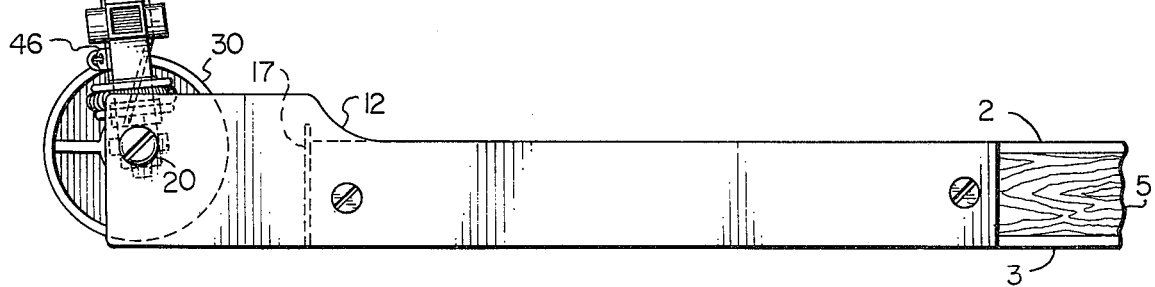
FIG. 7 is a partial end elevation of the apparatus of FIGS. 1-3.

Laterally extending portion 39 protrudes beyond the lower surface of stop bar 21 and clears stops 54 except for one stop 48 which is longer than the other stops, as seen in FIG. 3 and as shown in phantom lines in FIG. 4. Stop 48 is located near the bottom end of the stop bar, and is positioned so that when the guide strip and the supporting structure reaches the bottom of the paper, stop 48 comes in contact with portion 39, preventing further independent rotation of the stop bar. At that position, further rotation of knob 30 causes the entire stop bar and guide bar assembly to rotate about the axis of the stop bar formed by pivots 20 and 29, lifting the guide strip from the paper as shown in FIG. 7.

It will be noticed that the longer stop 48 can be inserted at any location along stop bar 21 to accommodate the preferred length of paper to be used.

A first pulley 40 is mounted for free rotation on a short axle 41 which is mounted on that surface of shaft 18 which normally faces toward side edge 6. A second pulley 42 at the opposite end of the mechanism is mounted for free rotation on a bracket and axle assembly 43 which is fixedly attached to spacer member 29. An extension coil spring 44 similar in nature to the type of spring employed in a motion picture projector, has one end hooked into an opening 45 in strip 14 in the vicinity of abutment means 36. The spring extends in the direction of bracket 12 and passes around pulley 40, and then extends beneath bracket 35 to the opposite end of the mechanism where it passes around pulley 42. The path of the spring is then again toward the lower end of the mechanism where it is attached to a small eye bracket 46 which is supported on spacer member 22. The spring continually tends to contract, and therefore continually urges member 14 toward bracket 12, i.e., toward the bottom edge of the support surface.

Figure 5:
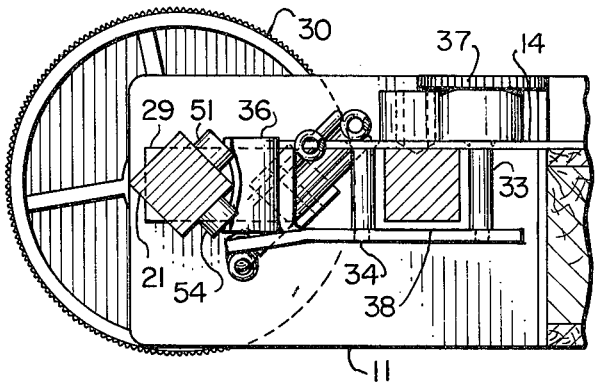

Stop bar 21 is provided with a plurality of sets of stop members 47, a set of stop members being defined as a linear array of substantially equally protruding members on one face of bar 21. It will be observed that each set of stop members is angularly separated from each other by 90° because shaft 21 is square. However, it is contemplated that other shapes can be used for the stop bar in which case the angle would not be 90°, but it is essential that the angle between adjacent sets of stop members be equal and that the sum of the angles between sets totals 360°. It will also be observed that each set of stop members constitutes an equally spaced group of members and that the spacing of each set is the same as the spacing of each other set. It will further be observed that each set is linearly offset from each adjacent set, the longitudinal distance between each stop member and the closest stop member of an adjacent set defining a distance which represents the desired spacing between adjacent lines or writing zones on and that the stop spacing is directly related to the width of the slot 15 in that the stops are spaced so that the zones successively exposed do not overlap. The stop members 47 can be, and are depicted in FIGS. 4 and 5 as being, cap head machine screws with allen sockets, these screws being threaded into tapped openings in bar 21. They can, however, be ratchet type surfaces in a molded plastic bar or protrusions of any other convenient shape. It will be noted that the surfaces of the stop members which face in the direction of bracket 11 are the surfaces which are primarily active and of operative significance.

Figure 6:
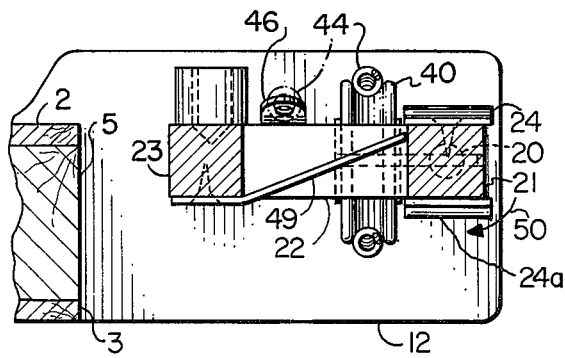
FIG. 6 is a partial section along line 6—6 of FIG. 3.

In FIG. 6 there is shown a means for preventing rotation of the stop bar in one direction or, conversely, means for allowing rotation of the stop bar in only one direction. This means comprises a leaf spring 49, one end of which is fixedly attached to the under surface of guide bar 23, spring 49 being bent upwardly and extending across the gap between bar 23 and bar 21 with the distal end of the spring coming in contact with the inwardly facing surface of stop bar 21. Bar 21 is designed to be rotated in the direction of arrow 50, and it will be recognized that rotation in that direction will simply cause the leaf spring to bend upwardly, the effect being to only minimally inhibit the rotation of the bar. However, an effort to rotate bar 21 in the direction opposite arrow 50 causes the inner surface to press against the end of spring 49, thus preventing rotation in that direction.

The operation of the foregoing apparatus can now be described. Paper is placed under clip 10 on support surface 2 with the left-hand edge of the paper against guides 16 and 17 and the operator grasps knob 37 and pushes the writing guide strip toward clip 10 until the strip stops when guard strip 31 comes in contact with spacer 28. The knob is then released and spring 44 pulls the strip in the direction of bracket 12 until abutment member 36 comes in contact with the first stop member 51 of the set of stop members which protrude from the surface of bar 21 which faces guide bar 23. That situation is depicted in FIG. 4. The user then places his writing implement in slot 15 and writes until he reaches the end of the slot. He is then ready to move to the next line and, to do so, grasps and manually rotates knob 30 in whichever direction it will turn which will be in one direction only, with no need for the blind person to concern himself about direction. In the assembly described, this rotation will be in the direction shown by arrow 52 in FIG. 4 for a right-handed person. Sufficient force must be exerted to cause detent springs 24 and 24a to flex as the corner of rectangular bar 21 rotates past it. As the bar rotates, stop 51 is gradually moved out of contact with the abutment member as depicted in FIG. 5. However, as soon as stop member 51 is rotated out of contact, the next stop member 54, which was previously protruding from the bottom surface of bar 21, is rotated into a position in which it protrudes into the path of travel of abutment member 36. Thus, as soon as contact terminates between the abutment member and stop 51, spring 44 urges the abutment member and slide 14 toward bracket 12 until the abutment member comes in contact with stop 54. The spacing between stops 51 and 54 in the longitudinal direction of bar 14 is selected so that at least the lower edge of slot 15 is moved the desired distance to present a new writing zone. Thus, the user can proceed to write across this new zone, whereupon he again rotates the knob, causing the same sequence of events as described with reference to FIGS. 4 and 5 to occur. It will be observed, as mentioned in connection with FIG. 6, that the user cannot inadvertently rotate the knob in the opposite direction because of spring 49. Thus, there is no possibility of the slide moving the larger distance between a stop of one set and the next stop in the next set in the opposite direction around bar 21. That, in effect, would be the equivalent of three spaces rather than 1. In this connection, it will be seen that the stop members in their respective sets and with the longitudinal offset illustrated in FIG. 1 form a helical path around the stop bar.

As soon as guide strip 14 has arrived at the bottom of the page, the sheet of paper on which writing has been completed can be removed and a new sheet installed, whereupon knob 37 is again pushed to return the slide to its uppermost position. To facilitate placement of a piece of paper on the surface, the structure is designed so that guide strip 14, guide bar 23 and stop bar 21, together with the associated pulleys, spacer members and the spring can all be rotated around the axis of stop bar 21, as depicted in FIG. 7. This rotation is possible because axle 29 and pivot pin 20 are rotatable in the openings provided therefor in brackets 11 and 12, respectively. Thus, the entire assembly is rotatable to a position in which support surface 2 is left clear. A new sheet of paper can then be extracted from the cavity within housing 1 and placed under clip 10. The strip is then rotated back to its position adjacent the guide surface and the process is repeated.

Figure 8:
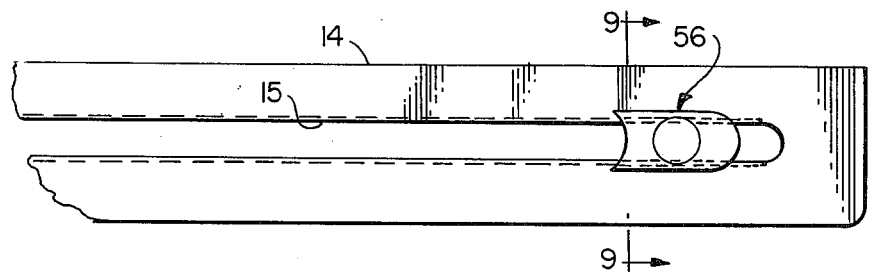
FIG. 8 is a further embodiment of a writing guide member usable in the apparatus of FIGS. 1-7.
Figure 9:
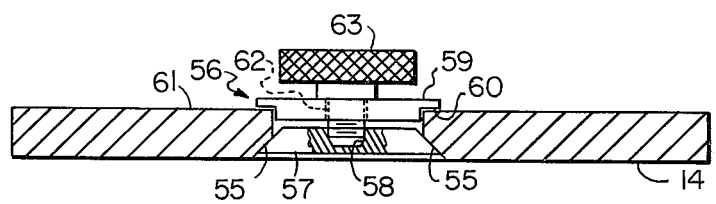
FIG. 9 is a sectional view along line 9—9 of FIG. 8.

As illustrated in FIG. 8, it is desirable to provide an adjustable stop within slot 15 so that, if desired, pages of various widths can be used up to, e.g., 8½ inches, and the user will not inadvertently write past the edge of the page. For this purpose, it is contemplated that strip 14 would be made of a length sufficient to accommodate the widest anticipated page width and that slot 15 would be extended in a similar fashion. An adjustable stop can then be provided as shown in FIGS. 8 and 9. For this purpose, the under surface of the edges of slot 15 can be beveled as at 55 to receive a stop member indicated generally at 56. Member 56 includes a rectangular body 57 having a central internally threaded hole 58, the lateral edges of member 57 being beveled to meet with surfaces 55. An upper member 59 is provided with shoulders 60 and 61 which can rest on the upper surface of strip 14, the central portion thereof residing in slot 15 to prevent motion transversely with respect to the slot. An externally threaded screw 62 passes through a central opening in member 59 and engages the threads in opening 58. Screw 62 is provided with a knurled knob 63 which can be rotated to loosen the threads, permitting the structure to be longitudinally moved along slot 15 to a desired position adjacent the edge of the paper, whereupon the knob can again be rotated to tighten the adjustable stop, locking it in position beyond which the writing implement cannot be used. If the thickness of the material used to make strip 14 is sufficient, the upper edge of slot 15 can also be beveled and member 59 can be provided with beveled downwardly facing edges rather than being undercut to form the shoulders described in connection with FIGS. 8 and 9. The advantage of this alternative structure is that it provides a stop without having surfaces except for knob 63 protruding about the upper surface of guide strip 14.

Figure 10:
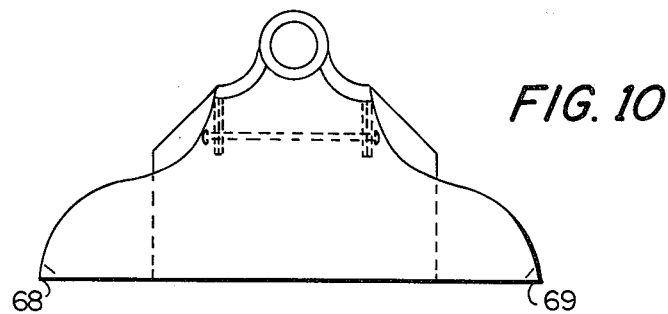
FIGS. 10 and 11 are plan and elevation views, respectively, of a paper retaining clip usable in the apparatus of FIGS. 1-7.
Figure 11:
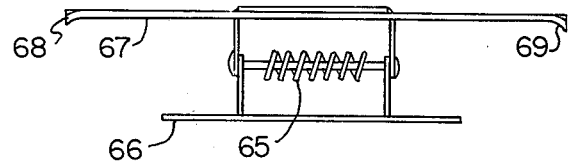

Spring clip 10 is shown in greater detail in FIGS. 10 and 11, the clip being generally conventional in nature and having a portion spring 65 which is connected between mounting portions 66 and clip 67, the mounting portion being secured to edge 4 of the support structure and clip 67 having an edge which lies on the paper adjacent surface 2. It has been found, however, that conventional clips of this type are not sufficiently strong to retain paper in an apparatus of this type. Accordingly, this invention contemplates improving the clip by bending the corner ends 68 and 69 of the clip downwardly, providing points which tend to grip the paper more firmly and retain it in position, even when frictionally engaged by the user's hand or the undersurface of strip 14.

Figure 12:
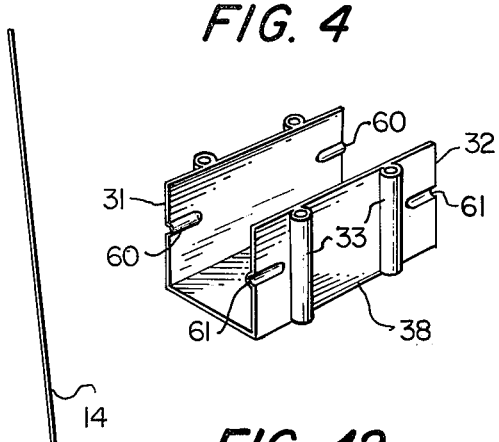
FIG. 12 is a perspective view of a support and guide sleeve usable in the apparatus of FIGS. 1-5.

As separately shown in FIG. 12, the U-shaped guide member 38 is provided with side walls 31 and 32 and carries sleeves 33 through which screws 35 pass to hold the guide strip in sliding relation with bar 23. In this connection, it will be observed that the four screws 35 (one of which has knob 37 as its head) can be removed to replace the guide strip with a different one having a longer or wider slot to suit the needs of the user.

Member 38 is also provided with indentations 60 in wall 31 and indentations 61 in wall 32, these indentations being for the purpose of minimizing friction and drag and, thereby, permitting the sliding mechanism to move more easily under the force of spring 44. These indentations are formed by deforming the metal of the side walls by striking them with a suitably shaped instrument.

A further embodiment of this invention which is contemplated but not illustrated for the sake of simplicity is the provision of a stop apparatus including rotatable stop means, guides, etc., as described with reference to FIGS. 1–6 which can be provided on strip 14 itself. The purpose of this apparatus is to provide guidance in the direction perpendicular to that disclosed in FIGS. 1–7, particularly for printing and the like. However, this apparatus would be essentially the same as that disclosed in FIG. 1 except that the rotatable nature of the entire structure, as illustrated in FIG. 7, need not exist.

It will also be recognized that the apparatus can be assembled with the stop and guide assembly placed along the opposite edge of the writing surface so that the apparatus can be easily used by a left-handed person. It is particularly significant that no changes to the structure other than the mounting brackets are needed in order to accomplish this reversal of parts. The direction of rotation indicated by arrows 50 and 52 of stop bar 21 and knob 30 would be reversed in this reversed arrangement.

While certain advantageous embodiments have been chosen to illustrate the invention, it will be understood by those skilled in the art that various changes and modifications can be made therein without departing from the scope of the invention as defined in the appended claims.

I claim:
1. A writing guide for the blind comprising the combination of
    means for defining a writing support surface having top and bottom edges and side edges;
    means for retaining material to be written on on said surface;
    an elongated writing guide strip having an elongated slot therein to define a zone within which a writing implement can be used; and
    means for supporting said writing guide strip adjacent to said surface with said slot extending substantially perpendicular to said side edges and for moving said writing guide strip parallel to itself in predetermined increments from a location near said top edge toward a location near said bottom edge, said means comprising
    spring means for continuously urging said writing guide strip toward said bottom edge;
    a plurality of stops;
    abutment means carried by and movable with said strip for contacting said stops; and
    manually rotatable means for successively moving said stops into the path of travel of said abutment means as said rotatable means is rotated, each stop moved into said path of travel for contact with said abutment means being longitudinally spaced from the preceding stop by a distance equal to the desired space between writing lines on the material retained on said surface.
2. A writing guide for the blind comprising the combination of
    means for defining a writing support surface having top and bottom edges and side edges;
    means for retaining material to be written on on said surface;

an elongated writing guide strip having an elongated slot therein to define a zone within which a writing implement can be used; and means for supporting said writing guide strip adjacent to said surface with said slot extending perpendicular to said side edges and for moving said writing guide strip parallel to itself in predetermined increments from a location near said top edge toward a location near said bottom edge, said means comprising guide means for supporting said writing guide strip for sliding motion parallel to said side edges;

spring means for urging said strip toward said bottom edge;

a stop bar having a plurality of sets of radially protruding stop members;

means for mounting said stop bar for rotation about an axis parallel with one of said side edges;

each of said sets of stop members including a plurality of stop members arranged in a spaced linear array along a line parallel with said axis, each of said sets of stop members being angularly separated from each adjacent set thereof by a predetermined angle with all of said angles being equal and the total of said angles being 360°, each of said stop members being longitudinally offset from the closest stop members in adjacent sets by a distance defining an increment of movement of said strip;

means carried by and movable with said writing guide strip for contacting one stop member at a time; and means for manually rotating said stop bar through said predetermined angle to permit said means for contacting to lose contact with one stop member and move into contact with the next longitudinally offset stop member in the next adjacent set in response to the urging of said spring means.

3. A writing guide according to claim 2 wherein said guide means comprises
a rectangular guide bar; and
bracket means for mounting said guide bar in parallel spaced relationship with said stop bar;
and wherein said writing guide strip includes means for supporting said strip on said guide bar for sliding movement.

4. A writing guide according to claim 3 wherein said bracket means further comprises
means for mounting said guide bar for rotation about an axis parallel with said one of said side edges.

5. A writing guide according to claim 2 wherein said stop bar comprises a square shaft, and wherein said sets of stop members project from the flat faces of said shaft and are separated by 90°.

6. A writing guide according to claim 5 wherein said guide means comprises a rectangular guide bar.

7. A writing guide according to claim 5 wherein said means for mounting said stop bar comprises
first and second brackets extending beyond one of said side edges substantially parallel to said top and bottom edges, respectively;
a short mounting shaft extending from said second bracket toward said first bracket;
a pivot pin protruding from the distal end of said mounting shaft and into one end of said stop bar to permit rotation of said stop bar; and
an axle extending through said first bracket and into the other end of said stop bar, said axle being rotatable in said first bracket and fixedly attached to said stop bar;
and wherein said means for manually rotating said stop bar comprises a knob attached to said axle.

8. A writing guide according to claim 7 wherein said guide means comprises
a guide bar extending parallel to and spaced from said stop bar,
a first spacer member extending between and fixedly attached to one end of said guide bar and said mounting shaft;
a second spacer member extending between the other end of said guide bar and said axle, said axle being rotatable in said second spacer member.

9. A writing guide according to claim 8 wherein said second bracket includes a second pivot pin for pivotally attaching said mounting shaft thereto, whereby said guide strip, said guide bar, said stop bar and said first and second spacer members are rotatable as a unit about the axis of said stop bar.

10. A writing guide according to claim 9 and further comprising detent means including
at least one leaf spring fixedly attached to said mounting shaft, said leaf spring extending along a surface of said stop bar to urge said stop bar into one of four possible positions in which a face thereof is parallel with said leaf spring.

11. A writing guide according to claim 10 wherein said spring means comprises
a first pulley mounted on said mounting shaft;
a second pulley mounted on said second spacer member;
an extension coil spring having one end attached to said first spacer member and the other end attached to said writing guide strip, said spring following a path extending from said strip, around said first pulley and around said second pulley to said first spacer member.

12. A writing guide according to claim 11 and further comprising means for permitting rotation of said stop bar in only one direction comprising a leaf spring fixedly attached to said guide bar and extending to a face of said stop bar.

13. A writing guide according to claim 5 and further comprising
detent means for urging said stop bar into a rotational position in which one face thereof is parallel with said writing support surface.

14. A writing guide according to claim 2 and further comprising
detent means for positively positioning said stop bar into an angular position in which one of said sets of stop members extend substantially parallel with said support surface.

15. A writing guide according to claim 2 and further comprising means for preventing rotation of said stop bar in one direction.

16. A writing guide according to claim 2 wherein said means for retaining material to be written on comprises a spring clip having an edge spring-urged toward said surface, and wherein the ends of said edge are bent toward said surface to form material-engaging points.

17. A writing guide according to claim 2 and further comprising
adjustable stop means carried in said elongated slot for adjustably defining an end to the writing zone defined by said slot.

18. A writing guide according to claim 2 wherein said guide means comprises
a rectangular guide bar;
bracket means for mounting said guide bar in parallel spaced relationship with said stop bar;
an elongated U-shaped mounting bracket, opening upwardly and surrounding said guide bar on three sides, said bracket having indentations from the outer surface thereof to form guide bar-contacting regions on the inner surface thereof; and
means carried by said bracket for removably mounting said guide strip thereto.

* * * * *